(12) United States Patent
Chang et al.

(10) Patent No.: US 8,611,304 B2
(45) Date of Patent: Dec. 17, 2013

(54) METHOD, SYSTEM AND BASE STATION FOR TRANSMITTING DATA DURING CELL HANDOVER

(75) Inventors: Junren Chang, Shenzhen (CN); Yajuan Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1070 days.

(21) Appl. No.: 12/020,903

(22) Filed: Jan. 28, 2008

(65) Prior Publication Data

US 2008/0119189 A1    May 22, 2008

(30) Foreign Application Priority Data

Feb. 15, 2007   (CN) .......................... 2007 1 0080257
Sep. 28, 2007   (WO) ................ PCT/CN2007/070817

(51) Int. Cl.
*H04W 4/00* (2009.01)
*H04W 36/00* (2009.01)

(52) U.S. Cl.
USPC ........... 370/331; 455/436; 455/437; 455/438; 455/439; 455/443; 370/332; 370/333

(58) Field of Classification Search
USPC ................. 455/436–444, 33.2; 370/331–334
See application file for complete search history.

(56) References Cited

U.S. PATENT DOCUMENTS

| | | | |
|---|---|---|---|
| 6,590,905 B1 | 7/2003 | Suumaki et al. | |
| 2001/0055298 A1* | 12/2001 | Baker et al. | 370/349 |
| 2003/0007490 A1* | 1/2003 | Yi et al. | 370/394 |
| 2004/0081119 A1* | 4/2004 | Zhong et al. | 370/328 |
| 2005/0043050 A1 | 2/2005 | Lee et al. | |
| 2006/0148478 A1* | 7/2006 | Jeong et al. | 455/436 |
| 2007/0293227 A1* | 12/2007 | Jiang | 455/436 |

FOREIGN PATENT DOCUMENTS

| | | |
|---|---|---|
| CN | 1839653 A | 9/2006 |
| WO | WO 03/043251 A2 | 5/2003 |

OTHER PUBLICATIONS

Wenyu, "Long Term Evolution of UMTS: Network Architecture and Air Interface Protocol," *Telecommunications Science*, 29-33 (May 2006).

* cited by examiner

*Primary Examiner* — Jinsong Hu
*Assistant Examiner* — Dung Hong
(74) *Attorney, Agent, or Firm* — Leydig, Voit & Mayer, Ltd.

(57) ABSTRACT

A method for forwarding data during cell handover includes: forwarding, by a source base station, user plane data of Packet Data Convergence Protocol, PDCP, data units that have not been transmitted to a User Equipment, UE, to a target base station in a PDCP layer during cell handover. In addition, embodiments of the present invention further provide a system and devices for forwarding data during cell handover. In the method, a system and base stations are provided by the present invention, the data that have not been transmitted are forwarded in a layered manner respectively in at least one of the PDCP layer and RLC layer. Therefore, data transmission during cell handover is implemented and data loss due to the handover is avoided.

7 Claims, 6 Drawing Sheets

METHOD, SYSTEM AND BASE STATION FOR TRANSMITTING DATA DURING CELL HANDOVER

CROSS-REFERENCE TO RELATED APPLICATIONS

This application claims priority to Chinese Patent Application No. 200710080257.2 filed Feb. 15, 2007, and International Patent Application No. PCT/CN2007/070817, filed Sep. 28, 2007, both of which are hereby incorporated by reference.

FIELD OF THE INVENTION

The present invention relates to mobile communication technologies, and particularly, to a method, a system and base stations for transmitting data during cell handover.

BACKGROUND OF THE INVENTION

Evolved Universal Terrestrial Radio Access Network (UTRAN) is called enhanced UTRAN and E-UTRAN for short in Long-Term Evolution (LTE) research project.

In E-UTRAN, the structure of radio network controller (RNC)—NodeB is discarded and the E-UTRAN is completely composed of base station to simplify signaling procedure and reduce delay. In E-UTRAN, base stations communicate with each other by using Internet Protocol (IP) and logically connect with each other via X2 interfaces. Moreover, each of the base stations connects with an access gateway composed of a Mobility Management Entity (MME) and a User Plane Entity (UPE) via S1 interface.

E-UTRAN system is divided into a user plane and a control plane according to functions. The user plane mainly deals with service data of users and the control plane mainly deals with signaling.

In user plane protocol stack and control plane protocol stack, the functions of Packet Data Convergence Protocol (PDCP) sub-layer are located in an access gateway. The functions of the PDCP sub-layer mainly include header compression and decompression of IP data flows at the transmitting and receiving entity respectively, transmitting user data such as forwarding a PDCP Service Data Unit (PDCP-SDU) sent from Non Access Stratum (NAS) layer to Radio Link Control (RLC) layer.

In a conventional method, UE assisted network controlled handover is adopted during cell handover when UE switches between cells, i.e. the whole handover includes four processes of measurement-report-judgment-execution. When a source base station determines that the UE switches to a target cell according to measurement reports sent from the UE and a base station, the source base station directly communicates with a target base station via X2 interface to enable the target cell to prepare for resources. And then, the source base station notifies the UE of handover to the target cell. As the handover is finished, the target base station notifies the source base station of releasing radio resources which are held by the UE in the source cell. In addition, the source station transmits data that have not been transmitted to the target base station, and updates the relations among nodes in the user plane and nodes in the control plane.

Because there is no PDCP layer in a base station in the structure of a conventional protocol stack, both data and control signaling of a user are transmitted or retransmitted in RLC layer of a base station. When cell handover occurs and signaling handover procedure finishes, a target base station notifies MME and UPE of transferring a user plane path from an original base station to a new base station to avoid data loss in handover. The user plane path is established between a mobile gateway and a base station. And meanwhile, the source station transmits a data packet to the target base station via a user plane tunnel terminating at X2 interface in RLC layer. Such a mode is called data forwarding.

With the advance of evolution process, a viewpoint that the PDCP layer located in an access gateway is transferred to a base station has been proposed. The base station may directly compress and decompress the head of an IP data stream, and transmit the Packet Data Convergence Protocol-Service Data Unit (PDCP-SDU) to the RLC layer as the PDCP layer is transferred to the base station. When cell handover occurs, it is not applicable for forwarding or retransmitting both data and control signaling of a user in the RLC layer of a base station according to a convention method. Therefore, how to forward data during cell handover is an urgent problem to be settled at present.

SUMMARY

In view of the above, a method for forwarding data during cell handover is provided by embodiments of the present invention, and a system and base stations for forwarding data during cell handover are also provided by embodiments of the present invention to implement data transmission during cell handover.

A method for forwarding data during cell handover provided in the embodiments of the present invention includes:

forwarding, by a source base station, user plane dada of Packet Data Convergence Protocol, PDCP, data units that have not been transmitted to a User Equipment, UE, to a target base station in a PDCP layer during cell handover.

A system for forwarding data during cell handover provided in the embodiments of the present invention includes:

a source base station, configured to forward user plane dada of Packet Data Convergence Protocol, PDCP, data units that have not been transmitted to a UE to a target base station in a Packet Data Convergence Protocol, PDCP, layer during cell handover; and the target base station, configured to receive the user plane data of the PDCP data units from the PDCP layer of the source base station.

Devices for forwarding data during cell handover provided in the embodiments of the present invention include: two base stations.

One base station includes:

a communicating module, configured to establish a connection with a target base station; and a sending module, configured to forward user plane dada of Packet Data Convergence Protocol, PDCP, data units that have not been transmitted to a UE to the target base station in a PDCP layer during the cell handover.

The other base station includes: a communicating module, configured to establish a connection with a source base station; and a receiving module, configured to receive user plane data of Packet Data Convergence Protocol, PDCP, data units from a PDCP layer of the source base station during cell handover.

As can be seen from the above technical solutions provided by embodiments of the present invention, the source base station forwards the data that have not been sent out to the UE completely, to the target base station in at least one of the PDCP layer and RLC layer when cell handover is executed. The source base station transmits the data that have not been sent out completely in at least one of the PDCP layer and RLC layer in a layered transmission manner according to features of the data. Therefore, data transmission during cell handover is implemented and data loss due to the handover is avoided.

DETAILED DESCRIPTION OF THE INVENTION

Figure 1:
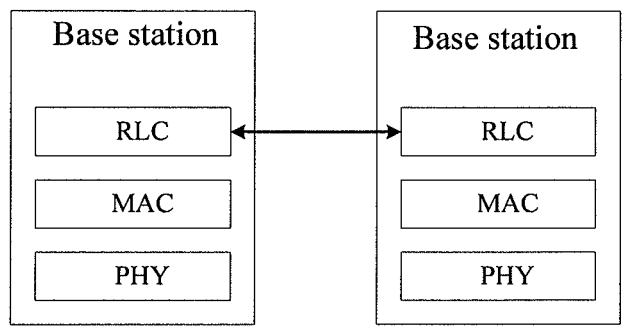
FIG. 1 is a schematic diagram illustrating data transmission between base stations during cell handover.

FIG. 1 is a schematic diagram illustrating data transmission between base stations during cell handover.

Figure 2:
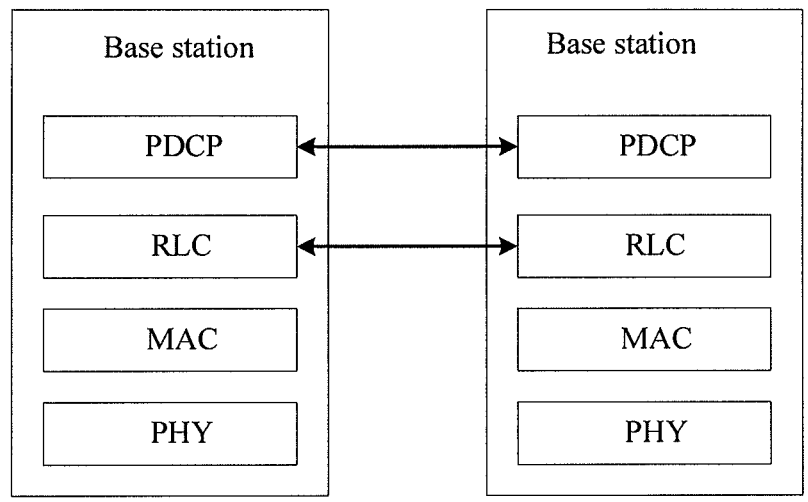
FIG. 2 is a schematic diagram illustrating data transmission between base stations during cell handover after the PDCP layer is transferred from an access gateway to a base station in accordance with an embodiment of the present invention.

In embodiments of the present invention, a source base station forwards data that have not been sent to a UE completely, to a target base station in at least one of the PDCP layer and RLC layer during cell handover. FIG. 2 is a schematic diagram illustrating data transmission between base stations after the PDCP layer is transferred from an access gateway to a base station in accordance with an embodiment of the present invention. It should be noted that the base station mentioned in embodiments of the present invention includes apparatus such as an eNodeB.

Figure 3:
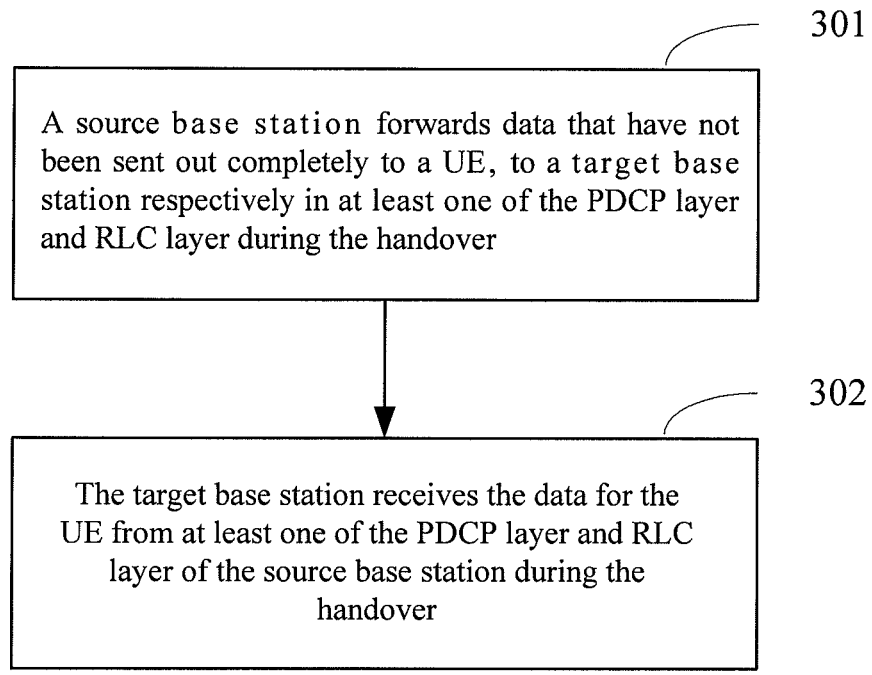
FIG. 3 is a simplified flow chart of a method for forwarding data during cell handover in accordance with an embodiment of the present invention.

FIG. 3 is a simplified flow chart of a method for forwarding data during cell handover in accordance with an embodiment of the present invention. As shown in FIG. 3, the procedure includes the following processes.

Block 301: A source base station forwards data that have not been sent out completely to a UE, to a target base station respectively in the PDCP layer and RLC layer during the cell handover.

The data that have not been sent out completely to the UE in this process may include user plane data and control plane data. The user plane data that have not been sent out completely to the UE includes PDCP data units that have not sent to the RLC layer in the PDCP layer, RLC data units which have not been sent out in the RLC layer to the UE and RLC data units whose receipt acknowledge has not been received from the UE. The control plane data that has not been sent out completely to the UE include Non Access Stratum (NAS) or Radio Resource Control (RRC) signaling data that has not been sent to the UE by the source base station.

The PDCP data units that have not been sent to the RLC layer in the PDCP layer may be forwarded to the target base station in the PDCP layer. The RLC data units that have not been sent to the UE in the RLC layer and the RLC data units whose receipt acknowledge has not been received from the UE may be mapped into PDCP data units and then forwarded the PDCP data units to the target base station in the PDCP layer, or be forwarded to the target base station in the RLC layer. The NAS or RRC signaling data that has not been sent out completely to the UE, or whose receipt acknowledge has not been received from the UE may be forwarded to the target base station in the RLC layer and may be forwarded to the target base station in the PDCP layer.

If Automatic Repeat Request (ARQ) function is set in the PDCP layer, an acknowledge indicating whether the PDCP data are exactly received fed back by a user may be received. And in such a case, the data that have not been sent out completely to the UE may merely include the PDCP data units that have not been sent to the UE in the PDCP layer and the PDCP data units whose receipt acknowledge has not been received from the UE, and the NAS or RRC signaling data which has not been sent to the UE from the source base station, or the NAS or RRC signaling data whose receipt acknowledge has not been received from the UE.

The PDCP data units layer that have not sent to the UE in the PDCP and the PDCP data units whose receipt acknowledge has not been received from the UE may be forwarded to the target base station in the PDCP layer. The NAS or RRC signaling data that has not been sent out to the UE, or the NAS or RRC signaling data whose receipt acknowledge has not been received from the UE may be forwarded to the target base station in the RLC layer or the PDCP layer.

Taking into consideration that the ARQ function is set in the RLC layer and the ARQ function is not required to be set in the PDCP layer all along, the ARQ function in the PDCP layer may merely be turned on before cell handover and be turned off after the cell handover is finished.

If the ARQ function is not turned on in time, the data that have not been sent out to the UE further includes RLC data units that have not been sent to the UE in the RLC layer and RLC data units whose receipt acknowledge has not been received from the UE. In such a case, forwarding the data to the target base station in the PCP layer and RLC layer further includes mapping the RLC data units into PDCP data units and forwarding the PDCP data units to the target base station in the PDCP layer; or forwarding the RLC data units to the target base station in the RLC layer.

In order to avoid data loss which is caused by the failure of the cell handover, the source base station may further buffer the data to be sent to the target base station during cell handover, delete the buffered data if the cell handover succeeds; otherwise, send the buffered data to the UE as the UE returns to the original cell successfully.

The PDCP data units mentioned in above process may be PDCP Service Data Units (SDUs) or PDCP Protocol Data Units (PDUs). Likewise, the RLC data units may be RLC SDUs or RLC PDUs.

Block 302: The target base station receives the data for the UE from the PDCP layer and RLC layer of the source base station during the cell handover.

The method for forwarding data during cell handover in accordance with an embodiment of the present invention is described. A system for forwarding data during cell handover in accordance with an embodiment of the present invention is described as follows.

Figure 4:
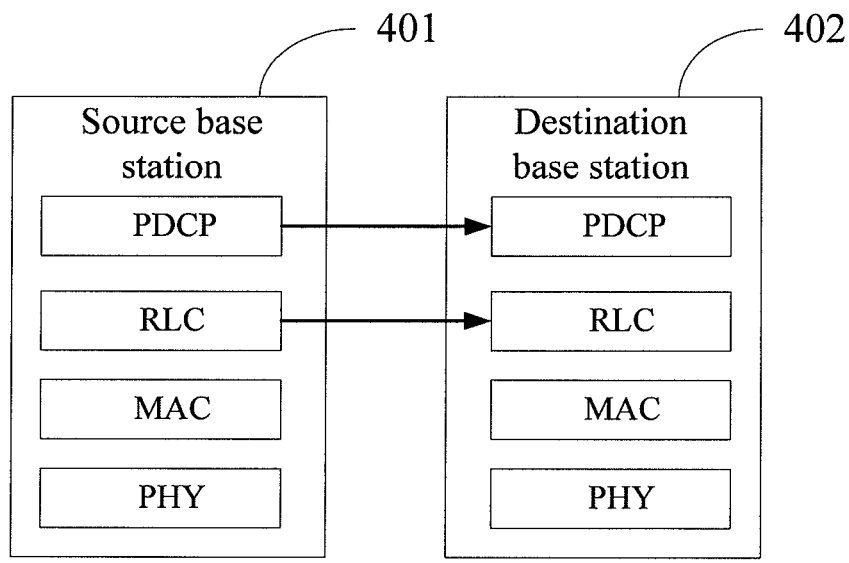
FIG. 4 is a schematic diagram illustrating the structure of a system for forwarding data during cell handover in accordance with an embodiment of the present invention.

Referring to FIG. 4, FIG. 4 is a schematic diagram illustrating the structure of a system for forwarding data during cell handover in accordance with an embodiment of the present invention. As shown in FIG. 4, the system includes a source base station and a target base station.

The source base station 401 is configured to forward data that have not been sent out completely to the UE, to the target base station 402 respectively in the PDCP layer and RLC layer during cell handover.

The target base station 402 is configured to receive the data for the UE from the PDCP layer and RLC layer of the source base station 401 during the cell handover.

The source base station and the target base station may transmit data in several methods during the cell handover.

One Embodiment

For example, the PDCP data units are PDCP SDUs in the embodiment.

Figure 5:
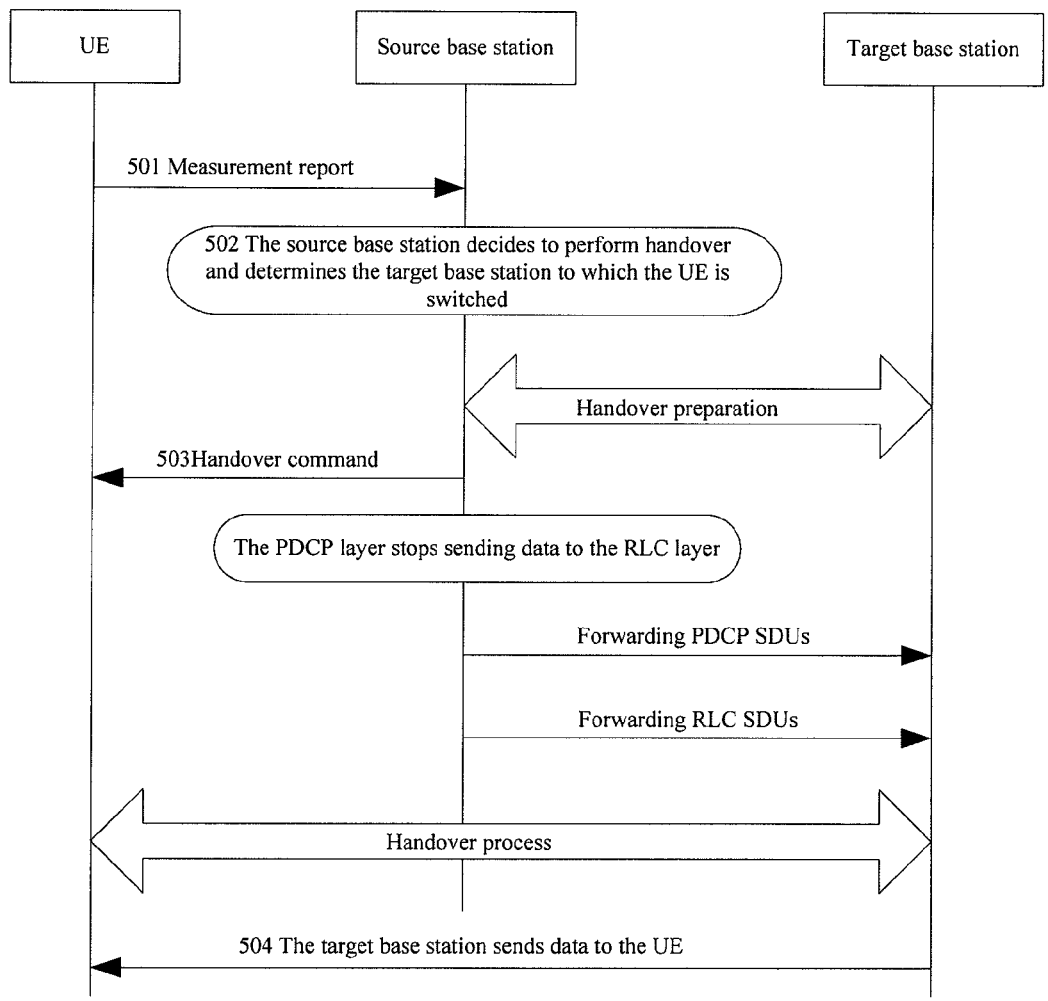
FIG. 5 is a simplified flow chart of a method for forwarding data during cell handover in accordance with a first embodiment of the present invention.

Referring to FIG. 5, FIG. 5 shows a simplified flow chart of a method for forwarding data during cell handover in accordance with the first embodiment of the present invention. As shown in FIG. 5, the procedure includes the following processes.

Process 501: A UE sends a measurement report to a source base station.

Process 502: The source base station decides to perform cell handover and determines a target base station and a target cell to which the UE is to be switched. The target base station prepares parameters related to the cell handover.

Process 503: The source base station sends a handover command to the UE, and the UE departs from the source cell and starts to access the target cell upon the receipt of the handover command.

The PDCP layer stops transmitting user plane data to the RLC layer and forwards the user plane data, such as PDCP SDUs (s denotes that there are multiple PDCP SDUs), to the target base station during the cell handover. The source base station maps at least one of the user plane RLC SDUs and RLC PDUs that have not been sent out into PDCP SDUs. At least one of the user plane RLC SDUs and RLC PDUs includes those that have not been sent out and those unacknowledged (the receipt acknowledge is not received from the user). And then, the PDCP layer forwards the PDCP SDUs to the target base station.

If there is still a portion of NAS or RRC signaling data that has not been transmitted to the UE, or whose receipt acknowledge has not been received from the UE during cell handover, the RLC layer of the source base station forwards the NAS or RRC signaling data to the target base station, i.e. the RLC layer forwards the RLC SDUs carrying the NAS or RRC signaling data to the target base station. The NAS or RRC signaling data may further be forwarded to the target base station in the PDCP layer of the source base station.

A portion of NAS or RRC signaling data is also required to be acknowledged by a user. If the NAS or RRC signaling data is required to be acknowledged by the user, the data that have not been sent out completely to the UE may further include the NAS or RRC signaling data whose receipt acknowledge has not been received from the UE.

Process 504: The UE receives the data from the target base station as the cell handover is finished.

In this embodiment, the buffering of the PDCP SDUs may be further prepared as the cell handover decision is made, and then the PDCP SDUs are buffered before the PDCP SDUs are forwarded to the target base station. Therefore, the data may not be lost even if the cell handover fails and the data may be sent to the UE as the UE returns to the original cell successfully. The buffered data may be released when the cell handover succeeds.

In above procedure, it is taken as the example that the PDCP data units are PDCP SDUs. The PDCP data units may be PDCP PDUs in practical applications.

The method for forwarding data during cell handover in accordance with the first embodiment of the present invention is described above. Another system for forwarding data during cell handover in accordance with the first embodiment of the present invention is described as follows.

Figure 6:
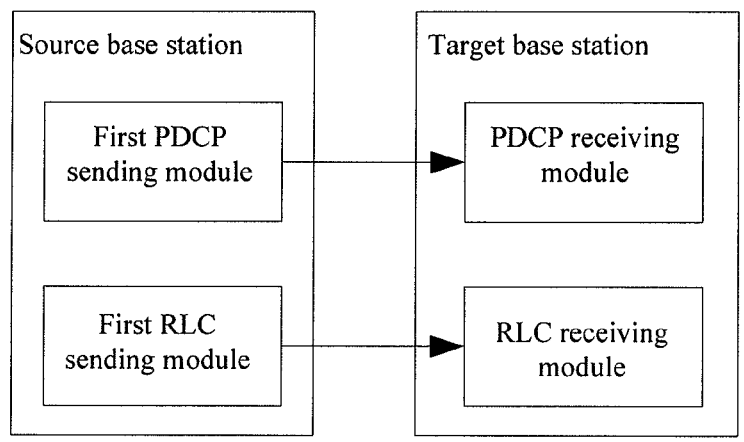
FIG. 6 is a schematic diagram illustrating the structure of a source base station and a target base station in accordance with the first embodiment of the present invention.

In this embodiment, the makeup, connection relation and function of the system for forwarding data during cell handover are the same as those shown in FIG. 4. As shown in FIG. 6, FIG. 6 is a schematic diagram illustrating the structure of a source base station and a target base station in this embodiment. The source base station in this embodiment may include a first PDCP sending module and a first RLC sending module in practical application.

The first PDCP sending module is configured to forward PDCP data units in the PDCP layer that have not been transmitted to the RLC layer to the target base station in the PDCP layer, map RLC data units in the RLC layer that have not been sent to the UE and RLC data units in the RLC layer whose receipt acknowledge has not been received from the UE into PDCP data units, and forward the PDCP data units to the target base station during the cell handover.

The first RLC sending module is configured to forward NAS or RRC signaling data that has not been sent to the UE or NAS or RRC signaling data whose receipt acknowledge has not been received from the UE, to the target base station in the RLC layer during the cell handover.

The first PDCP sending module may be further configured to buffer the PDCP data units before sending PDCP data units to the target base station. The buffered data may be released if the handover succeeds; otherwise, the buffered data are sent to the UE as the UE returns to the original cell successfully.

It should be noted that the source base station may further include a first communicating module configured to establish a connection with the target base station.

The PDCP data units in this embodiment may be PDCP SDUs or PDCP PDUs, and the RLC data units may be at least one of user plane RLC SDUs and user plane RLC PDUs.

Moreover, as shown in FIG. 6, the target base station may include a PDCP receiving module and an RLC receiving module in practical application.

The PDCP receiving module is configured to receive the data for the UE from the PDCP layer of the source base station during the cell handover.

The RLC receiving module is configured to receive the data for the UE from the RLC layer of the source base station during the cell handover.

It should be noted that the target base station may include a communicating module configured to establish a connection the source base station.

In addition, the target base station may not be divided into modules or may be divided into other modules to implement the functions mentioned above.

Another Embodiment

For example, PDCP data units are PDCP SDUs and ARQ function is set in the PDCP layer.

Figure 7:
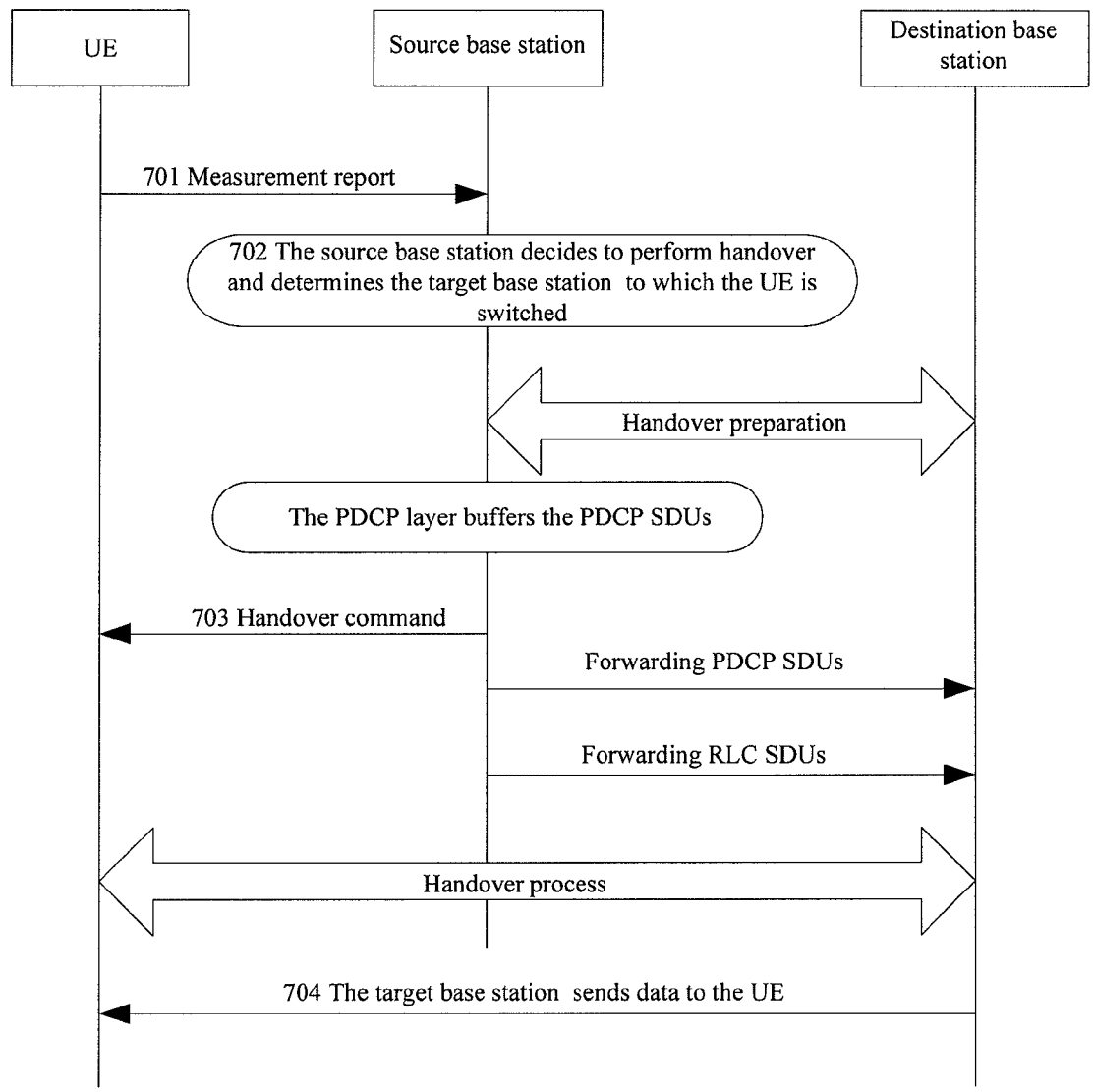
FIG. 7 is a simplified flow chart of a method for forwarding data during cell handover in accordance with a second embodiment of the present invention.

Refer to FIG. 7, FIG. 7 is a simplified flow chart of a method for forwarding data during cell handover in accordance with the second embodiment of the present invention. As shown in FIG. 7, the procedure includes the following processes.

Process 701: A UE sends a measurement report to a source base station.

Process 702: The source base station decides to perform cell handover, determines a target base station and a target cell to which the UE is to be switched, and prepares the buffering of the PDCP SDUs. The target base station prepares parameters related to the cell handover.

Process 703: The source base station sends a handover command to the UE, and the UE departs from the source cell and starts to access the target cell upon the receipt of the handover command.

The source base station forwards all PDCP SDUs that have not been sent out completely, which include PDCP SDUs that have not been sent out and PDCP SDUs whose receipt acknowledge has not been received from UE to the target base station. If there are a portion of NAS signaling data and RRC signaling data that have not been sent to the UE or a portion of NAS signaling data and RRC signaling data whose receipt acknowledge has not been received from the UE during the cell handover, the NAS signaling data and RRC signaling data are forwarded to the target base station in the RCL layer of the source base station or in the PDCP layer of the source base station. The source base station may discard all residual PDCP PDUs as the cell handover succeeds.

Process 704: The UE receives the data from the target base station as the cell handover is finished.

In the above procedure, it is taken as an example that the PDCP data units are PDCP SDUs. The PDCP data units may further be PDCP PDUs in practical applications. Accordingly, the only thing to do is to change the PDCP SDUs in the above procedure to PDCP PDUs.

The method for forwarding data during cell handover in accordance with the second embodiment of the present invention is described in detail above. A system for forwarding data during cell handover in accordance with the second embodiment of the present invention is described as follows.

In this embodiment, the system for forwarding data during cell handover is the same as the system shown in FIG. 4 in makeup, connection relation and function. Moreover, the structure and connection relation of a source base station in this embodiment are similar to those of the source base station shown in FIG. 6. The difference is that the source base station in this embodiment is specifically implemented to include the following functional modules.

A second PDCP sending module is configured to forward PDCP data units in the PDCP layer to a target base station during the cell handover. The PDCP data units include such units that have not been sent to the UE and units whose receipt acknowledge has not been received from the UE A second RLC sending module is configured to forward the NAS or RRC signaling data to the target base station in the RLC layer during the cell handover. The NAS or RRC signaling data includes signaling data that has not been sent to the UE, or signaling data whose receipt acknowledge has not been received from the UE.

Likewise, the second PDCP sending module may be further configured to buffer the PDCP data units before sending the PDCP data units to the target base station. The buffered PDCP data units may be released when the cell handover succeeds; otherwise the buffered PDCP data units are sent to the UE provided that the UE returns to the original cell when the cell handover fails.

The PDCP data units in this embodiment may be PDCP SDUs or PDCP PDUs, while the RLC data units may be at least one of user plane RLC SDUs and user plane RLC PDUs.

In addition, the target base station in this embodiment may be implemented according to the description of the first embodiment.

Another Embodiment

In this embodiment, it is taken as an example that the PDCP data units are PDCP SDUs, ARG function is set in the PDCP layer, and the ARQ function is turned on before the cell handover and is turned off after the cell handover.

Figure 8:
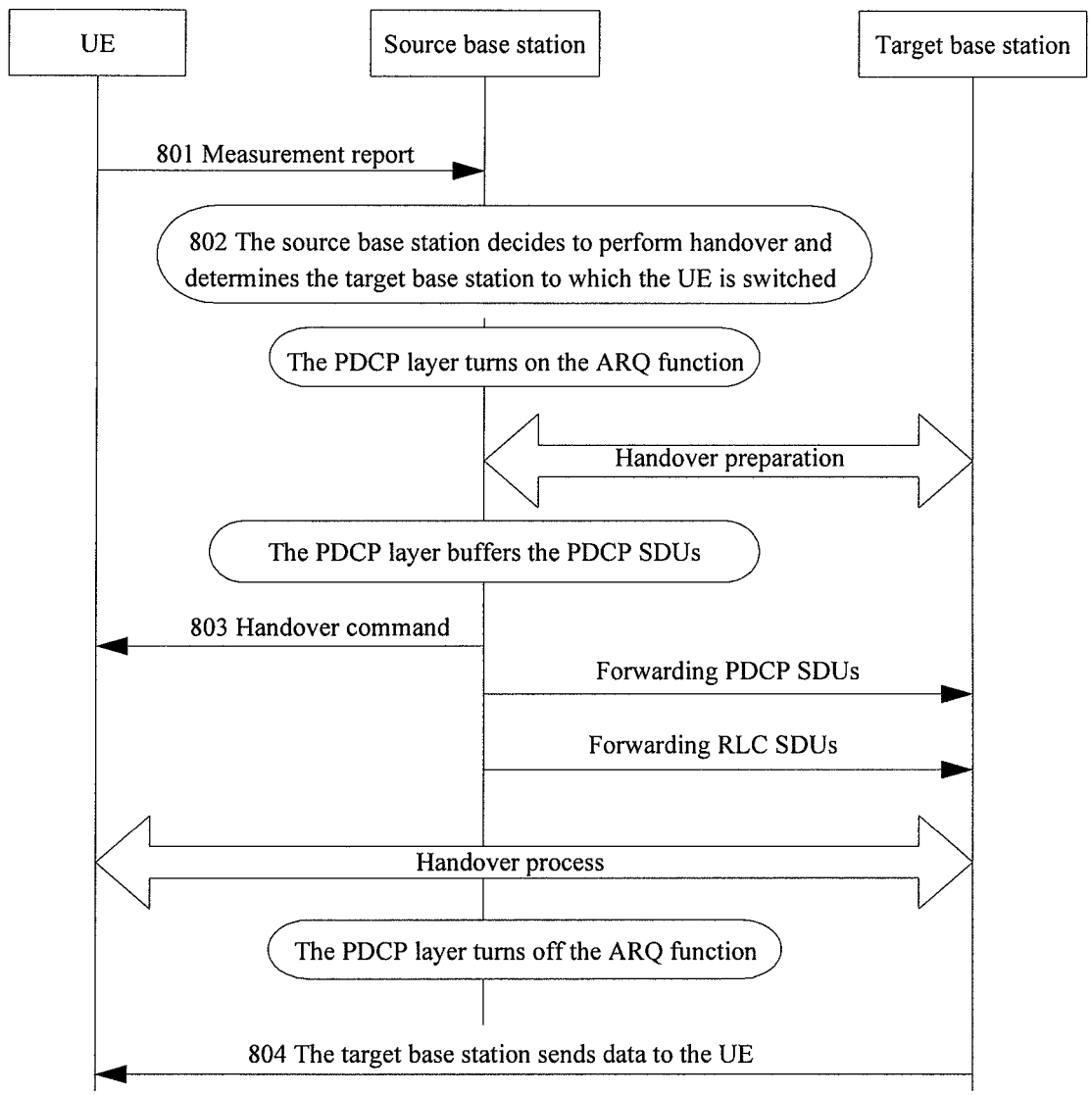
FIG. 8 is a simplified flow chart of a method for forwarding data during cell handover in accordance with a third embodiment of the present invention.

As shown in FIG. 8, FIG. 8 is a flow chart of a method for forwarding data during cell handover in accordance with the third embodiment of the present invention. As shown in FIG. 8, the procedure includes the following processes.

Process 801: A UE sends a measurement report to a source base station.

Process 802: The source base station decides to perform cell handover. A source eNode starts up the ARQ function in the PDCP layer, and prepares to buffer PDCP SDUs. A target base station prepares parameters related to the cell handover.

In Process 803: The source base station sends a handover command to the UE. The UE departs from the source cell and starts to access the target cell after receiving the handover command.

During the cell handover process, the source base station forwards all the PDCP SDUs that have not been sent completely to the target base station. The PDCP SDUs include PDCP SDUs that have not been sent out and PDCP SDUs whose receipt acknowledge has not been received from UE. If there are data that have not been acknowledged in the PDCP layer because the ARQ function in the PDCP layer is not turned on in time, the data such as RLC SDUs and RLC PDUs are forwarded to the target base station in the RLC layer in the source base station, or are mapped into PDCP SDUs by the source base station and then forwarded to the target base station in the PDCP layer. The source base station may discard all the residual PDCP SDUs after the cell handover succeeds.

If there is NAS or RRC signaling data that has not been transmitted to the UE or whose receipt acknowledge has not been received from the UE during the cell handover. The NAS or RRC signaling data is forwarded to the target base station in the RCL layer of the source base station, or in the PDCP layer of the source base station.

The correct data transmission is still ensured by the ARQ function in the RLC layer after the UE is switched to the target base station successfully. The ARQ function in the PDCP layer is turned off.

In Process 804: The UE receives the data from the target base station.

In the above procedure, it is taken as an example that the PDCP data units are PDCP SDUs. However, the PDCP data units may further be PDCP PDUs in practical applications. Accordingly, the only thing to do is to change the PDCP SDUs in the above procedure to PDCP PDUs.

The method for forwarding data during cell handover in accordance with the third embodiment of the present invention is described in detail above. Next, a system for forwarding data during cell handover in accordance with the third embodiment of the present invention is described as follows.

In this embodiment, a system for forwarding data during cell handover is the same as the system shown in FIG. 4 in makeup, connection relation and function. Moreover, the structure and connection relation of the source base station in this embodiment are similar to those of the source base station shown in FIG. 6. The difference is that the source base station in this embodiment is specifically implemented to include the following functional modules.

A third PDCP sending module is configured to turn on the ARQ function when a cell handover decision is made, forward PDCP data units in the PDCP layer to a target base station during the cell handover; and turn off the ARQ function when the cell handover succeeds. The PDCP data units include PDCP data units that have not been sent to the UE and PDCP data units whose receipt acknowledge has not been received from the UE.

A third RLC sending module is configured to forward NAS or RRC signaling data to the target base station in the RLC layer during the cell handover. The NAS or RRC signaling data includes NAS or RRC signaling data that has not been sent to the UE or whose receipt acknowledge has not been received from the UE.

Likewise, the third PDCP sending module may be further configured to buffer the PDCP data units before sending the PDCP data units to the target base station. The buffered PDCP data units may be released when the handover succeeds; otherwise the buffered PDCP data units are sent to the UE when the UE returns to the original cell when the cell handover fails.

The PDCP data units in this embodiment may be PDCP SDUs or PDCP PDUs, while the RLC data units may be at least one of user plane RLC SDUs and user plane RLC PDUs.

In addition, the target base station in this embodiment may be implemented according to the description of the first embodiment.

Another Embodiment

In this embodiment, it is taken as an example that the PDCP data units are PDCP SDUs.

Figure 9:
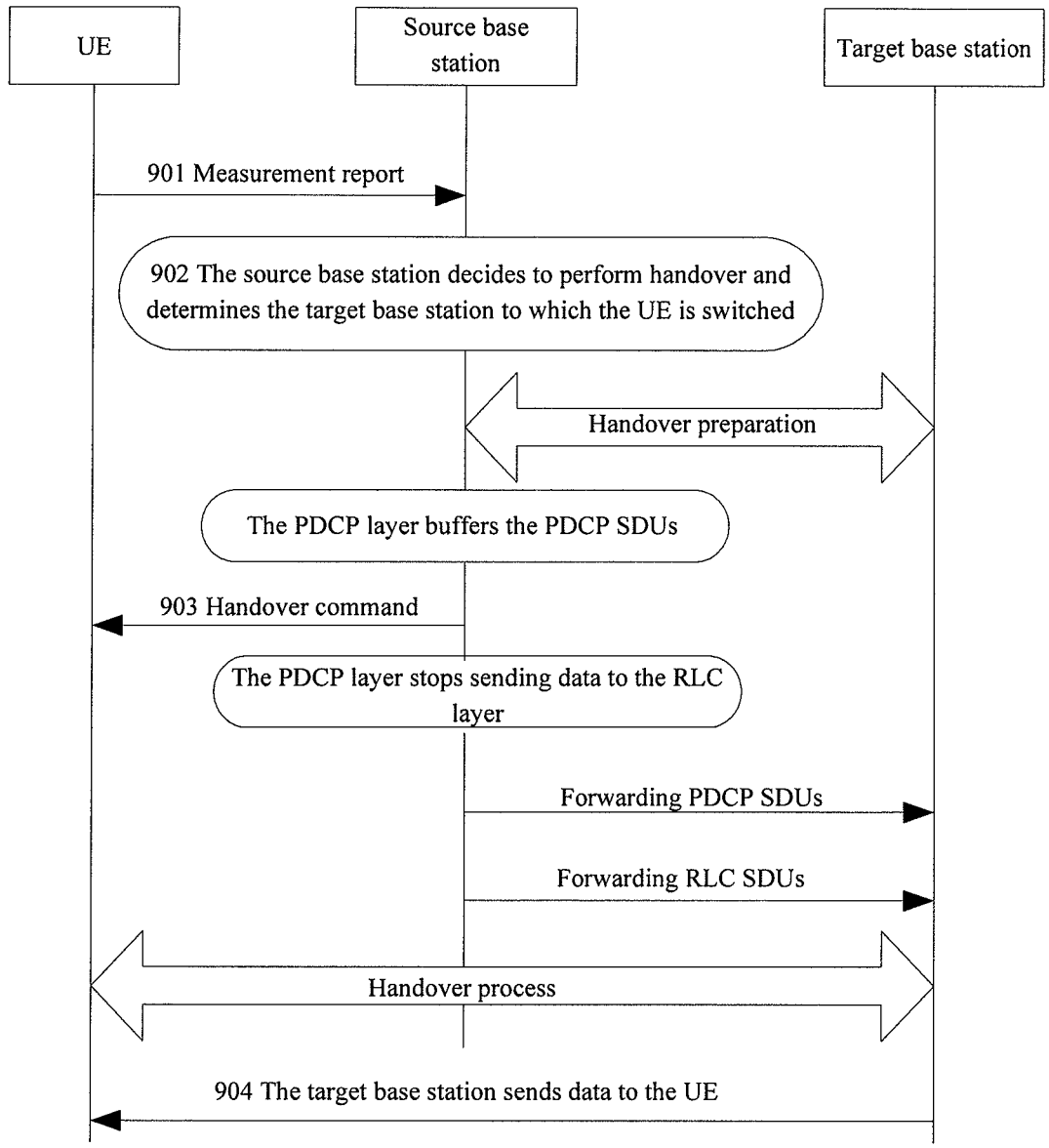
FIG. 9 is a simplified flow chart of a method for forwarding data during cell handover in accordance with a fourth embodiment of the present invention.

As shown in FIG. 9, FIG. 9 is a flow chart of a method for forwarding data during cell handover in accordance with the fourth embodiment of the present invention. As shown in FIG. 9, the procedure includes the following processes.

In Process 901: A UE sends a measurement report to a source base station.

In Process 902: The source base station decides to perform cell handover and prepares to buffer PDCP SDUs. A target base station prepares parameters related to the cell handover.

In Process 903: The source base station sends a handover command to the UE. The UE departs from the source cell and starts to access the target cell after receiving the handover command.

During the cell handover process, the PDCP layer stops transmitting user plane data to the RLC layer and forwards the PDCP SDUs to the target base station. The source base station forwards all data that have not been sent completely such as RLC SDUs and RLC PDUs, to the target base station. The data includes data that have not been sent and data whose receipt acknowledge has not been received.

In Process 904: The UE receives the data from the target base station when the cell handover is finished.

In the above procedure, it is taken as an example that the PDCP data units are PDCP SDUs. However, the PDCP data units may further be PDCP PDUs in practical applications. Accordingly, the only thing to do is to change the PDCP SDUs in the above procedure to PDCP PDUs.

The method for forwarding data during cell handover in accordance with the fourth embodiment of the present invention is described in detail above. Next, a system for forwarding data during cell handover in accordance with the third embodiment of the present invention is described as follows.

In this embodiment, a system for forwarding data during cell handover is the same as the system shown in FIG. 4 in makeup, connection relation and function. Moreover, the structure and connection relation of the source base station in this embodiment are similar to those of the source base station shown in FIG. 6. The difference is that the source base station in this embodiment is specifically implemented to include the following functional modules.

A fourth PDCP sending module is configured to forward PDCP data units in the PDCP layer to the target base station in the PDCP layer when the cell handover is performed. The PDCP data units include PDCP data units that have not been forwarded to the RLC layer.

A fourth RLC sending module is configured to forward RLC data units in the RLC layer to the target base station when the cell handover is performed, and forward NAS or RRC signaling data to the target base station in the RLC layer. The RLC data units include the RLC data units that have not been sent to the UE and the RLC data units whose receipt acknowledge has not been received from the UE. The NAS or RRC signaling data includes the NAS or RRC signaling data that has not been sent to the UE or the NAS or RRC signaling data whose receipt acknowledge has not been received from the UE.

Likewise, the fourth PDCP sending module may be further configured to buffer the PDCP data units before sending the PDCP data units to the target base station. The buffered PDCP data units may be released when the cell handover succeeds; otherwise the buffered PDCP data units are sent to the UE provided that the UE returns to the original cell when the cell handover fails.

The PDCP data units in this embodiment may be PDCP SDUs or PDCP PDUs while the RLC data units may be at least one of user plane RLC SDUs and user plane RLC PDUs.

In addition, the target base station in this embodiment may be implemented according to the description of the first embodiment.

In the specific embodiments described above, the objects, technical solutions and benefits of the present invention are further described in detail all by taking the LTE system as an example. However, in practical applications, the technical solutions in accordance with the present invention are also applicable to other communication systems where the circumstances are similar, such as High Speed Packet Access (HSPA) evolution system. Therefore, it is to be appreciated that the foregoing are only preferred embodiments of the present invention and are not for use in limiting the protection scope thereof, and all the modifications, equivalent replacements or improvements in the scope of the present invention's sprit and principles shall be included in the protection scope of the present invention.

What is claimed is:

1. A method for forwarding data during cell handover in Long-Term Evolution (LTE), comprising:
   forwarding, by a source base station, data that has not completed transmission to a User Equipment (UE) to a target base station in a Packet Data Convergence Protocol (PDCP) layer during cell handover, comprising:
   forwarding user plane data of first PDCP data units that have not been transmitted to a Radio Link Control (RLC) layer of the source base station to the target base station in the PDCP layer;
   mapping RLC data units in the RLC layer that have not been transmitted to the UE and RLC data units in the RLC layer whose receipt acknowledge have not been received from the UE into second PDCP data units;

forwarding user plane data of the second PDCP data units to the target base station in the PDCP layer during the cell handover;

turning on Automatic Repeat Request function in the PDCP layer; and forwarding user plane data of third PDCP data units in the PDCP layer that have not been transmitted to the UE and user plane data of fourth PDCP data units in the PDCP layer whose receipt acknowledge have not been received from the UE to the target base station during the cell handover, and turning off the Automatic Repeat Request function after the cell handover completes;

wherein the RLC data units in the RLC layer that have not been transmitted to the UE and the RLC data units in the RLC layer whose receipt acknowledge have not been received from the UE are RLC Protocol Data Units (PDUs).

2. The method of claim 1, further comprising at least one of:

forwarding non-access layer (NAS) signaling data or Radio Resource Control (RRC) signaling data that has not been transmitted to the UE, to the target base station in the RLC layer or the PDCP layer; and forwarding NAS or RRC signaling data whose receipt acknowledge has not been received from the UE in the RLC layer or the PDCP layer.

3. The method of claim 1, further comprising:

buffering the first PDCP data units and the second PDCP data units in the PDCP layer.

4. The method of claim 1, wherein the first PDCP data units and the second PDCP data units comprise: PDCP Service Data Units (SDUs), or PDCP PDUs.

5. The method of claim 1, wherein forwarding, by the source base station, the data that has not completed transmission to the UE to the target base station in the PDCP layer further comprises at least one of:

forwarding, by the source base station, user plane data of third PDCP data units that have not been transmitted to the UE to the target base station in the PDCP layer; and forwarding, by the source base station, user plane data of fourth PDCP data units whose receipt acknowledge have not been received from the UE to the target base station in the PDCP layer.

6. A system for forwarding data during cell handover in Long-Term Evolution (LTE), comprising:

a source base station, comprising:

a communicating module, configured to establish a connection with a target base station; and a sending module, configured to forward data that has not completed transmission to a User Equipment (UE) to the target base station in a Packet Data Convergence Protocol (PDCP) layer during cell handover;

wherein the sending module comprises: a first PDCP sending module, configured to:

forward user plane data of first Packet Data Convergence Protocol (PDCP) data units that have not been transmitted to a Radio Link Control (RLC) layer of the source base station to the target base station layer in the PDCP layer;

mapping RLC data units in the RLC layer that have not been transmitted to the UE and RLC data units in the RLC layer whose receipt acknowledge have not been received from the UE into second PDCP data units; and forwarding user plane data of the second PDCP data units to the target base station in the PDCP layer during the cell handover; and a second PDCP sending module, configured to turn on Automatic Repeat Request function in the PDCP layer, forward user plane data of third PDCP data units in the PDCP layer that have not been transmitted to the UE and user plane data of fourth PDCP data units in the PDCP layer whose receipt acknowledge have not been received from the UE to the target base station during the cell handover, and turn off the Automatic Repeat Request function after the cell handover completes;

wherein the RLC data units in the RLC layer that have not been transmitted to the UE and the RLC data units in the RLC layer whose receipt acknowledge have not been received from the UE are RLC Protocol Data Units (PDUs); and the target base station, configured to receive the user plane data of the first PDCP data units and the user plane data of the second PDCP data units from the PDCP layer of the source base station.

7. A base station in Long-Term Evolution (LTE), comprising:

a communicating module, configured to establish a connection with a target base station; and a sending module, configured to forward data that has not completed transmission to a User Equipment (UE) to the target base station in a Packet Data Convergence Protocol (PDCP) layer during cell handover;

wherein the sending module comprises:

a first PDCP sending module, configured to:

forward user plane data of first Packet Data Convergence Protocol (PDCP) data units that have not been transmitted to a Radio Link Control (RLC) layer of the source base station to the target base station layer in the PDCP layer;

mapping RLC data units in the RLC layer that have not been transmitted to the UE and RLC data units in the RLC layer whose receipt acknowledge have not been received from the UE into second PDCP data units; and forwarding user plane data of the second PDCP data units to the target base station in the PDCP layer during the cell handover; and a second PDCP sending module, configured to turn on Automatic Repeat Request function in the PDCP layer, forward user plane data of third PDCP data units in the PDCP layer that have not been transmitted to the UE and user plane data of fourth PDCP data units in the PDCP layer whose receipt acknowledge have not been received from the UE to the target base station during the cell handover, and turn off the Automatic Repeat Request function after the cell handover completes;

wherein the RLC data units in the RLC layer that have not been transmitted to the UE and the RLC data units in the RLC layer whose receipt acknowledge have not been received from the UE are RLC Protocol Data Units (PDUs).

* * * * *